United States Patent [19]
Pantone

[11] 3,962,807
[45] June 15, 1976

[54] X-RAY FILM CODED IDENTIFICATION SYSTEM

[75] Inventor: Anton M. Pantone, Winnetka, Ill.

[73] Assignee: CHI Systems, Inc., Evanston, Ill.

[22] Filed: Dec. 17, 1974

[21] Appl. No.: 533,486

[52] U.S. Cl.............................. 40/78.15; 40/359; 40/360
[51] Int. Cl.² ...................................... G09F 11/30
[58] Field of Search......... 40/78.15, 104.05, 104.08, 40/124.2, 359, 360, 106.1; 35/24 R

[56] References Cited
UNITED STATES PATENTS
| | | | |
|---|---|---|---|
| 1,929,383 | 10/1933 | Barker............................. | 40/78.15 |
| 3,755,937 | 9/1973 | Anderson.......................... | 40/78.15 |

FOREIGN PATENTS OR APPLICATIONS
| | | | |
|---|---|---|---|
| 785,558 | 5/1968 | Canada............................. | 35/24 R |

Primary Examiner—Louis G. Mancene
Assistant Examiner—John H. Wolff
Attorney, Agent, or Firm—Charles M. Chadd

[57] ABSTRACT

A system for identifying X-rays is provided wherein coded visual display means are affixed to X-ray films to enable a radiologist to identify at a glance the body part or body system radiographed and the particular visit among a series of visits at which the X-ray was taken. Written X-ray findings are affixed to the X-ray storage envelope and coded visual display means are also affixed to the findings to enable quick identification of the proper radiograph. The information code used can be either a color code or a symbolic code or a combination of both.

6 Claims, 2 Drawing Figures

X-RAY FILM CODED IDENTIFICATION SYSTEM

BACKGROUND AND SUMMARY OF THE INVENTION

This invention is a system for handling and organizing both radiographs (X-rays) and the written patient records resulting from X-ray examination. The system makes use of visual coding techniques to enable the radiologist and other individuals, such as attending physicians and radiological technicians, to identify at a glance those X-rays and related written findings from a patient's medical history which are relevant to the problem he is presently studying. The system is of particular benefit when the physician is treating a patient with a varied and lengthy medical history.

The common method presently used to store and organize X-rays is merely to file all of the X-rays of a patient in an envelope. Written findings relating to the X-rays are either stored separately or written on the storage envelope. In order to locate and identify individual films when using the prior art system, it is necessary to manually go through each X-ray picture in a patient's history, hold it up to the light and make a detailed observation of the radiograph's contents. If a series of radiographs of the same body system or body part must be reviewed and located from a lengthy medical history, then a substantial amount of valuable professional time is spent in the mere mechanical activity of identifying those portions of the patient's past history which are relevant to the problem at hand. To further complicate the process, it is then necessary to locate the written findings for each of the radiographs and correlate them to the picture.

In accordance with the present invention, a system is provided which affixes a coded visual display to the face of the X-ray film which provides information for determining by a quick observation of the radiograph which examination in a series of examinations the film relates to and also for determining the body system or body part represented in that film; the same code is visually displayed on the written findings referring to that X-ray. Furthermore, the system organizes the written findings in an orderly fashion on the front of the envelope to enable the fastest possible determination of the desired findings. The code can be either a color code or a symbolic code or a combination of the two.

In the embodiment of the invention disclosed herein, the X-ray coding system includes two sets of coded information labels which are affixed to the X-ray film. One set displays the information relating to the number of the visit and the second set visually discloses the subject matter X-rayed in the radiograph. In addition, a series of coded information labels are affixed to the written X-ray findings which are organized on the X-ray storage envelope, these labels relate the number of the visit to enable quick identification of the proper radiographs. In this particular embodiment, each information label is both color-coded and symbolically coded.

A radiologist using applicant's invention can easily select which ones of a large number of films he is interested in without going through the laborious process of holding up each film to view it; he need only quickly observe the film to make the proper identification. He then can quickly locate the written findings and radiographs for that visit and analyze the information contained therein. Applicant's invention allows the radiologist to substantially cut down the time spent in the mechanical act of locating relevant material in a patient's history so that he can devote a greater portion of his time to his primary concern — treating patients.

The system of the present invention can be used by itself or as an integral part of a computer organizational system whereby the patient's history is stored and recallable as needed.

Other features and advantages of the invention will be apparent from the following description and claims and are illustrated in the accompanying drawings which show structure embodying preferred features of the present invention and the principals thereof, and what is now considered to be the best mode in which to apply these principals.

BRIEF DESCRIPTION OF THE DRAWINGS

In the accompanying drawings forming a part of the specification, and in which like numerals are employed to designate like parts throughout the same.

DETAILED DESCRIPTION OF THE PREFERRED EMBODIMENT

Individual X-ray films are coded according to the number of each visit within a series of patient visits. In the preferred embodiment, the visit code is a color and numerically coded rectangular label as detailed in Table I.

TABLE I

| Visit Number | VISIT CODE Color Code |
|---|---|
| 1 | White |
| 2 | Yellow |
| 3 | Blue |
| 4 | Orange |
| 5 | Grey |
| 6 | Red |
| 7 | Light Green |
| 8 | Pink |
| 9 | Dark Green |
| 10 | Combination of White and Tan (Tan is Zero) |
| 11 | White and White |
| 12 | White and Yellow |
| . | . . . |
| 21 | Yellow and White |
| . | . . . |

Figure 1:
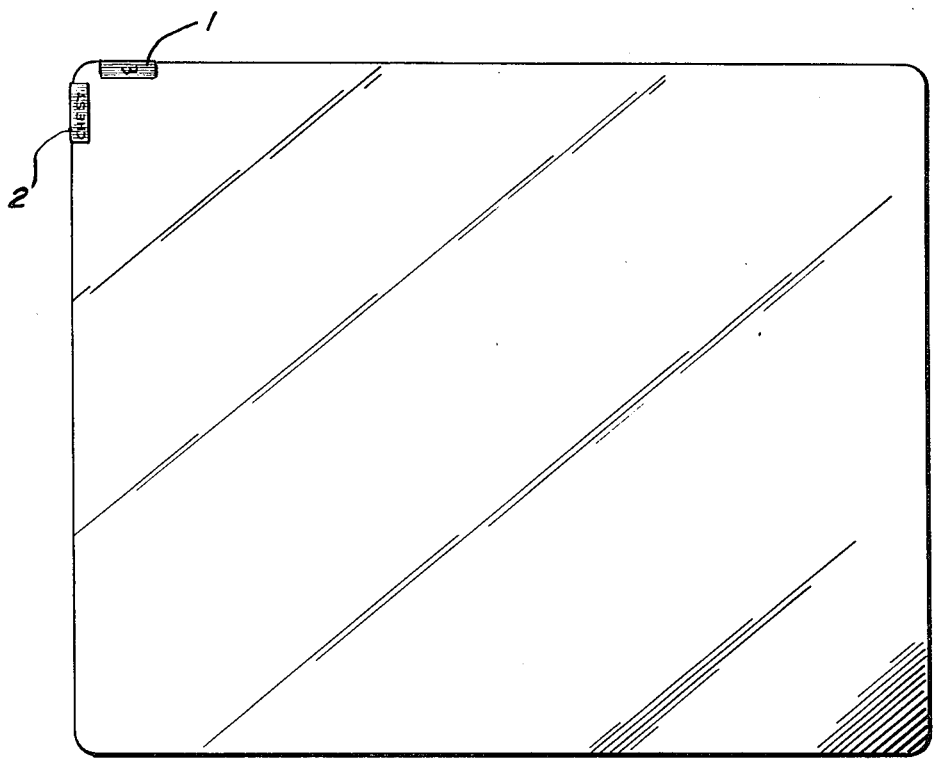
FIG. 1 is a drawing of an X-ray film with applicant's invention affixed to it.

Reference to FIG. 1 shows an X-ray film coded with the proper label 1 for the third visit affixed to the film in the upper left hand corner of the radiograph.

The X-ray films are also coded according to the body part or body system examined. In the preferred embodiment, the subject code is a color and verbally coded rectangular label as detailed in Table II.

TABLE II

| Subject Examined | SUBJECT CODE Color Code |
|---|---|
| Chest | Blue |
| Abdomen | Dark Green |
| Upper GI | Red |
| Spine | White |
| Head | Green |
| Lower GI | Brown |
| Small Bowel | Pink |
| Extremity | Violet |
| Intravenous Urogram | Yellow |

TABLE II-continued

| SUBJECT CODE | |
| --- | --- |
| Subject Examined | Color Code |
| Gallbladder | Orange |
| Myelography | Purple |
| Arteriography | Grey |

Reference to FIG. 1 shows an X-ray film coded with the proper label 2 for a chest X-ray affixed to the film in a position to the right of the visit code label.

Therefore, the face of each X-ray film in a patient's medical history is visually coded with the number of the visit and the body part or body system radiographed. Of course, in many instances, more than one film is taken during a single examination. When multiple X-rays are taken in a single visit, each film for that visit will contain the same visit code but the subject codes will differ according to the different body parts or body systems radiographed during the visit.

Figure 2:
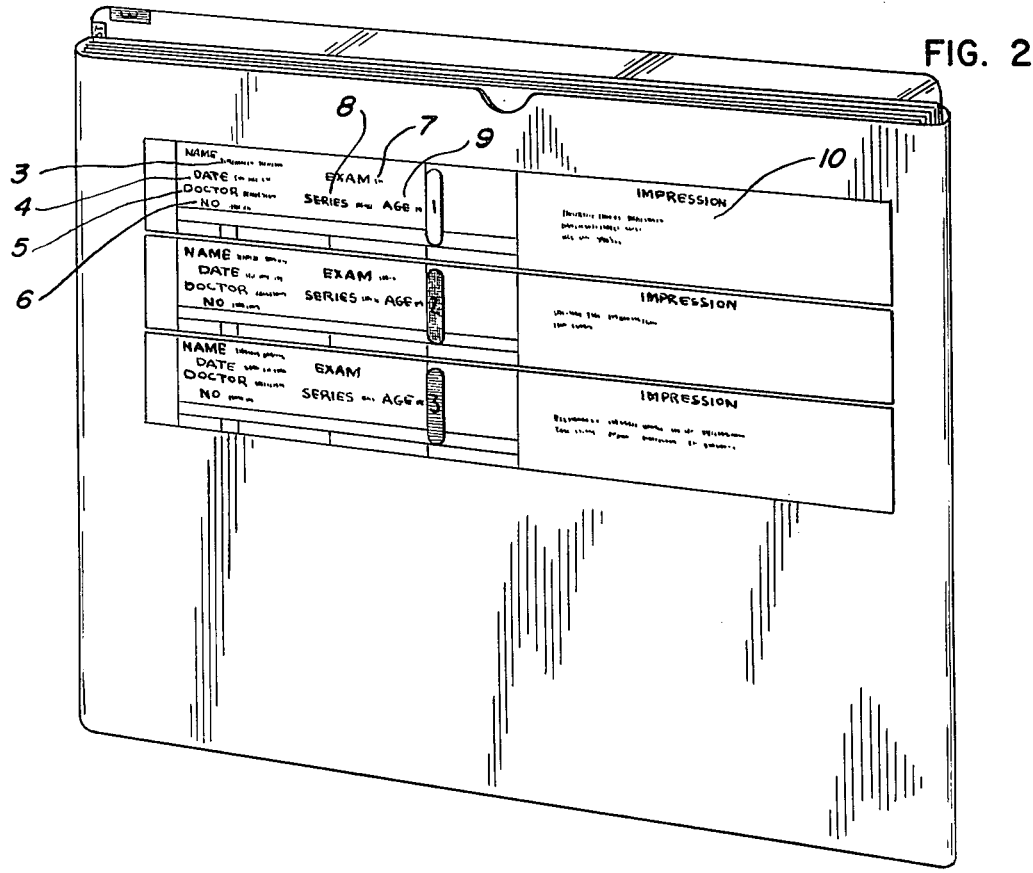
FIG. 2 is a drawing of a storage envelope including applicant's invention.

FIG. 2 discloses an X-ray film storage envelope with written medical findings appearing on the face of the envelope. The findings from each visit are placed on the envelope with the first visit placed on top and subsequent visits following down the envelope.

The lefthand side of the typical written findings format contains space for the identification of the patient 3, the date of the examination 4, the doctor's name 5, the X-ray file number 6, the subject matter examined 7, the number of the visit 8, and the patient's age 9, and, of course, other information may appear. The right hand side of the findings format contains space for the doctor's written impressions of his findings 10.

In the embodiment disclosed herein a visit code label 11 is affixed to each report of a visit. This enables the radiologist to instantaneously locate the findings from a particular visit and operates to relieve additional physician time for the performance of mechanical tasks.

The above described system can be used by itself or as an integral part of a computer based processing system. For example in a computer system the findings report can be computer generated and the written impressions of findings can be stored and recalled as needed.

Thus, while preferred constructional features of the invention are embodied in the structure illustrated herein; it is to be understood that changes and variations may be made by those skilled in the art without departing from the spirit and scope of the appended claims.

What is claimed is:

1. A method for identifying X-rays comprising:
    affixing a first series of labels to an X-ray film including a color coded portion and a symbolic coded portion representing the number of a particular visit in a series of visits;
    affixing a second series of labels for affixation to an X-ray film including a color coded portion and a symbolic coded portion representing the body part or body system radiographed; and
    affixing a third series of labels to physician's report of findings on an X-ray envelope including a color coded portion and a symbolic coded portion representing the number of a particular visit in a series of visits, wherein each series of labels allows the information represented therein to be readily apparent to an observer by a quick observation of the X-ray film.

2. A method for identifying X-rays and correlating them to written physician's findings comprising: affixing first information coded visual display means to an X-ray film wherein said information code represents the number of a particular visit in a series of visits and the body part or body system radiographed in the film so that affixture of said first display means to an X-ray film enables the particular visit and the body part radiographed to be readily apparent and identified without study of the film itself; and
    affixing second information coded visual display means to the physician's findings as exhibited on an X-ray film storage envelope wherein said information code represents the number of a particular visit in a series of visits so that affixture of said second display means to an X-ray film storage envelope enables the location of the findings corresponding to the particular X-ray film selected to be readily apparent without detailed study of the envelope itself so that the relevant X-ray film and corresponding physician's findings can be instantly correlated by visual inspection.

3. A method as in claim 2 wherein said information code is a color code.

4. A method as in claim 2 wherein said information code is a symbolic code.

5. A method as in claim 2 wherein said information code includes a color coded portion and a symbolic coded portion.

6. A method as in claim 2 wherein said first and second visual display means are labels attachable to said X-ray film and storage envelope respectively.

* * * * *